G. STRAND.
RAKING APPARATUS.
APPLICATION FILED OCT. 19, 1916.

1,296,227.

Patented Mar. 4, 1919.

Witnesses
W. C. Fielding.
H. B. Vrooman.

Inventor
George Strand
By Michael Beaven
Attorney

UNITED STATES PATENT OFFICE.

GEORGE STRAND, OF CORTLAND, ILLINOIS.

RAKING APPARATUS.

1,296,227.　　　　Specification of Letters Patent.　　Patented Mar. 4, 1919.

Application filed October 19, 1916. Serial No. 126,567.

*To all whom it may concern:*

Be it known that I, GEORGE STRAND, a citizen of the United States, residing at Cortland, in the county of Dekalb and State of Illinois, have invented certain new and useful Improvements in Raking Apparatus, of which the following is a specification.

This invention is a raking apparatus and has for its principal object the production of a raking mechanism carried upon a supporting frame and extending obliquely thereof, whereby the elements raked by the apparatus may be raked toward one side of the main frame.

Another object of this invention is the production of a raking apparatus wherein the auxiliary frame of the rake is supported by arms fixed upon a rotatable shaft carried by the main frame, whereby as the shaft is rotated, the height of the rake may be adjusted.

Another object of this invention is the production of a raking apparatus wherein the rake frame is rectangular and comprises semi-circular end walls provided with semi-circular partitions, together with a rotatable shaft having radiating rake tines extending therefrom, the partitions being interposed between the individual rake elements, thus removing leaves or other elements which may be carried upon the rake tines when the device is in use.

One practical form of construction and assembly of the present invention will be hereinafter described and is illustrated in the drawing in which.

Figure 1:
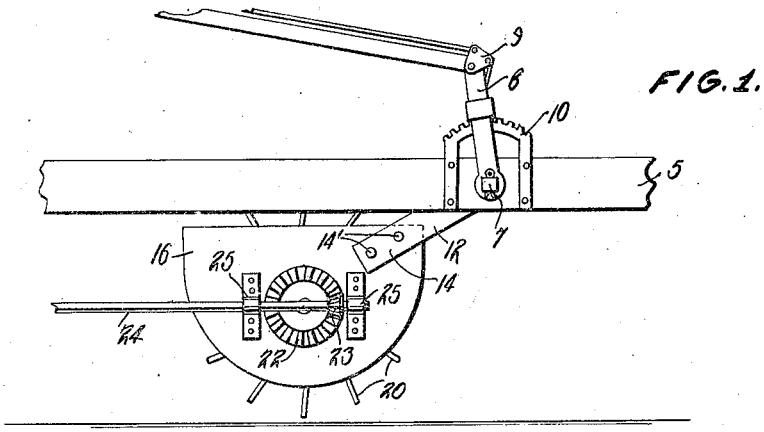
Figure 1 is a side elevation of the raking apparatus, portions of the supporting means, the driving means, and the adjusting means being fragmentarily shown.

In the preferred embodiment of the present invention about to be described, it will be seen that 5 indicates the side bars of the main frame which extend parallel to each other. The rotatable supporting shaft 6 is carried by the side bars as indicated clearly in Figs. 1 and 2 and has a squared end 7. The lever 8 is carried by the squared end 7 and has a detent 9 mounted thereon for engaging the quadrant 10 fixed upon one of the side bars 5. It is therefore obvious that the lever 8 may be shifted in either of two directions thus rotating the supporting shaft 6 and the engagement of the detent and the quadrant will retain the lever in an adjusted position.

Supporting arms 11 and 12 have sleeves 13 fixed upon the shaft 6. It will be noted that the arm 11 is considerably longer than the arm 12, while the end portions 14 of the arms are bent to extend obliquely to the major portions of the arms, thus causing the ends 14 to be parallel to each other for purposes to be hereinafter set forth.

Figure 2:
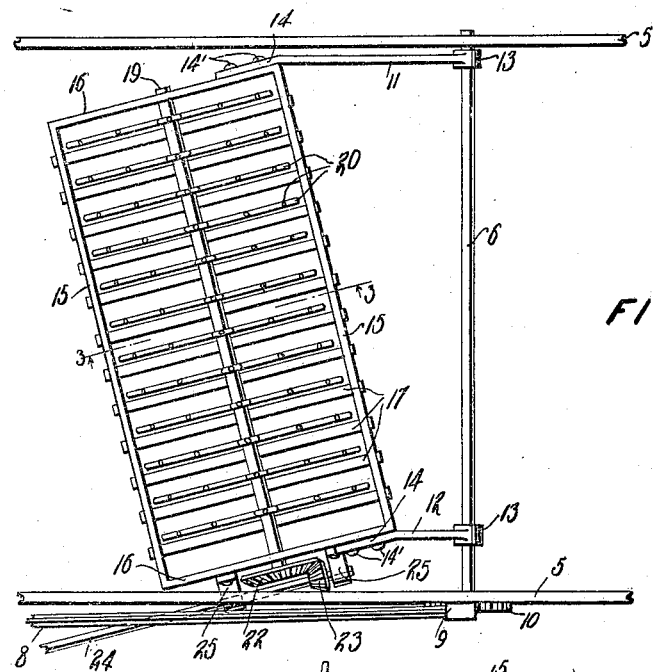
Fig. 2 is a top plan view of the device.
Figure 3:
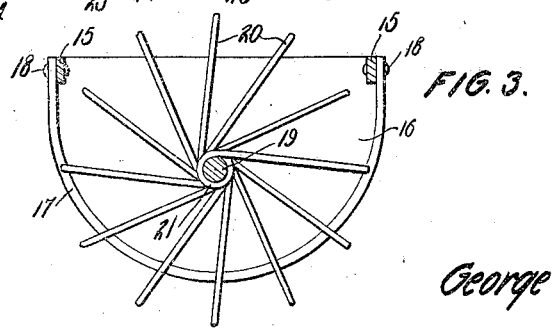
Fig. 3 is a section taken on the line 3—3 of Fig. 2.

The rake frame is substantially rectangular, as shown in Fig. 2 and consists of the side bars 15 connected by the end walls 16, it being noted that the end walls 16 are substantially semi-circular disk like structures, as illustrated in Figs. 1 and 3. The semi-circular partitions 17 are fixed as indicated at 18 upon the side bars 15 of the raked frame. It will be noted that the partitions 17 are carried in parallel spaced relation with respect to each other, as shown in Fig. 2.

A driving shaft 19 extends longitudinally of the rake frame and has its ends journaled in the end walls 16 of the rake frame. Each rake member comprises a plurality of similarly constructed radiating tines 20 which are engaged as indicated at 21 with the drive shaft 19. Each rake member, consisting of several tines, is carried contiguous to a partition 17, as shown in Figs. 2 and 3.

A bevel gear 22 is carried upon one end of the shaft 17 and meshes with the bevel pinion 23 keyed upon the rod 24 carried by brackets 25 upon one of the end walls 16. Any suitable power may be applied to the rod 24 for imparting rotary motion to the pinion 23 and the gear 22 to the shaft 19. It is obvious that as this shaft rotates the rake members consisting of the tines will be rotated to rake elements which may be in the path of movement of the raking apparatus.

By having the ends 14 extending obliquely and fixed as indicated at 14' upon the end walls 16, the rake frame will be held to extend obliquely to the main supporting frame of the apparatus.

The shifting of the lever 8 will cause the shaft 6 to be turned, thus swinging the ends 14 either upwardly or downwardly, whereby the height of the rake frame may be adjusted. As the raking apparatus moves forwardly the shaft 19 is driven by the means heretofore described, and the rake members will be rotated, although the position of the partitions adjacent the rake members will cause elements which may be caught by the tines to be quickly removed therefrom.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having fully described my invention, what I claim as new and desire to secure by Letters Patent:—

1. In a device of the character described, the combination of a main frame including parallel side bars, a supporting shaft mounted upon said side bars, means for rocking said supporting shaft and retaining the same in a set condition, supporting arms provided with sleeves keyed upon said shaft, one of said arms being longer than the remaining arms, said arms extending parallel to said side bars, the ends of said arms being bent to extend obliquely, a raking frame carried by said obliquely extending ends whereby said raking frame will extend obliquely to said first mentioned frame, although being between said side bars, and raking means for said raking frame.

2. In a device of the class described, the combination of a main frame, supporting means mounted upon said main frame, a raking frame consisting of a substantially rectangular structure having solid end walls, said supporting means being connected to the end walls for supporting said raking frame, and raking means carried within said frame, said walls constituting a guard for protecting the raking means and also preventing foreign elements from falling into the raking means at the ends of the frame.

In testimony whereof I affix my signature in presence of two witnesses.

GEORGE STRAND.

Witnesses:
ALBERT STRAND,
S. A. MILLIGAN.

Copies of this patent may be obtained for five cents each, by addressing the "Commissioner of Patents, Washington, D. C."